(12) United States Patent
Vann

(10) Patent No.: US 10,089,822 B2
(45) Date of Patent: Oct. 2, 2018

(54) WEARABLE WAGERING GAME SYSTEM AND METHODS

(71) Applicant: Bally Gaming, Inc., Las Vegas, NV (US)

(72) Inventor: James W. Vann, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 15/384,818

(22) Filed: Dec. 20, 2016

(65) Prior Publication Data

US 2017/0103600 A1 Apr. 13, 2017

Related U.S. Application Data

(63) Continuation of application No. 14/263,345, filed on Apr. 28, 2014, now Pat. No. 9,542,801.

(51) Int. Cl.
| | |
|---|---|
| A63F 9/24 | (2006.01) |
| A63F 13/00 | (2014.01) |
| G06F 17/00 | (2006.01) |
| G06F 19/00 | (2018.01) |
| G07F 17/32 | (2006.01) |
| G06F 3/01 | (2006.01) |

(52) U.S. Cl.
CPC ............ *G07F 17/323* (2013.01); *G06F 3/016* (2013.01)

(58) Field of Classification Search
CPC ............. G07F 17/3202; G07F 17/3204; G07F 17/3206; G07F 17/3209
See application file for complete search history.

(56) References Cited

U.S. PATENT DOCUMENTS

| | | |
|---|---|---|
| 5,669,818 A | 9/1997 | Thorner et al. |
| 6,429,846 B2 | 8/2002 | Rosenberg et al. |
| 6,703,550 B2 | 3/2004 | Chu |
| 6,906,697 B2 | 6/2005 | Rosenberg |
| 7,096,852 B2 | 8/2006 | Gregorio |
| 7,112,737 B2 | 9/2006 | Ramstein |
| 7,159,008 B1 | 1/2007 | Wies et al. |
| 7,198,137 B2 | 4/2007 | Olien |
| 7,245,202 B2 | 7/2007 | Levin |
| 7,283,120 B2 | 10/2007 | Grant |
| 7,369,115 B2 | 5/2008 | Cruz-Hernandez et al. |
| 7,830,361 B2 | 11/2010 | Muraki |
| 7,864,164 B2 | 1/2011 | Cunningham et al. |
| 8,098,234 B2 | 1/2012 | Lacroix et al. |
| 8,157,650 B2 | 4/2012 | Grant et al. |
| 8,210,942 B2 | 7/2012 | Shimabukuro et al. |
| 8,360,847 B2 | 1/2013 | Williams et al. |
| 8,500,534 B2 | 8/2013 | Rasmussen et al. |
| 8,624,857 B2 | 1/2014 | Cheung et al. |
| 8,678,923 B2 | 3/2014 | Radek et al. |
| 8,686,839 B2 | 4/2014 | Posamentier |

(Continued)

*Primary Examiner* — Kevin Y Kim
(74) *Attorney, Agent, or Firm* — Marvin A. Hein, Jr.

(57) ABSTRACT

In at least some aspects, the present concepts include a wearable haptic device including one or more input devices, one or more haptic output devices, one or more processors, and a communication device, wherein the one or more processors are configured to cause the one or more haptic output devices to output a haptic output, of a plurality of haptic outputs, responsive to an event in a game, of a plurality of possible game events, in accord with a mapping of haptic outputs to game events.

20 Claims, 6 Drawing Sheets

| Haptic Output | Example Haptic Output | Meaning of Haptic Output |
|---|---|---|
| Haptic Output #1 | Tap – Tap – Tap – Tap – Tap | Losing Spin |
| Haptic Output #2 | Tap – Tap – Tap – Tap – Tap + TapTap | Win of less than the total bet |
| Haptic Output #3 | Tap – Tap – Tap – Tap – Tap + TapTapTap | Win 1X bet |
| Haptic Output #4 | Tap – Tap – Tap – Tap – Tap + TapTapTap Shortbuzz | Win 5X bet |
| Haptic Output #5 | Tap – Tap – Tap – Tap – Tap + TapTapTap Longbuzz | Win 10X bet |
| Haptic Output #6 | Shortbuzz | Initiation of Spin |

(56) References Cited

U.S. PATENT DOCUMENTS

| | | |
|---|---|---|
| 8,721,416 B2 | 5/2014 | Grant et al. |
| 2002/0033795 A1 | 3/2002 | Shahoian et al. |
| 2003/0054881 A1* | 3/2003 | Hedrick ............ G07F 17/0014 463/29 |
| 2004/0189484 A1 | 9/2004 | Li |
| 2004/0192260 A1* | 9/2004 | Sugimoto ........... G06F 11/1456 455/412.1 |
| 2005/0248549 A1 | 11/2005 | Dietz et al. |
| 2006/0066569 A1 | 3/2006 | Eid et al. |
| 2006/0256075 A1 | 11/2006 | Anastas et al. |
| 2007/0063849 A1 | 3/2007 | Rosella et al. |
| 2008/0068334 A1 | 3/2008 | Olien et al. |
| 2008/0084384 A1 | 4/2008 | Gregorio et al. |
| 2008/0120029 A1 | 5/2008 | Zelek et al. |
| 2008/0132313 A1* | 6/2008 | Rasmussen ............ G07F 17/32 463/16 |
| 2009/0002328 A1 | 1/2009 | Ulrich et al. |
| 2009/0326406 A1 | 12/2009 | Tan et al. |
| 2012/0184367 A1 | 7/2012 | Parrott et al. |
| 2012/0302302 A1 | 11/2012 | Hamlin et al. |
| 2012/0302323 A1 | 11/2012 | Gagner et al. |
| 2012/0319827 A1 | 12/2012 | Pance et al. |
| 2013/0296053 A1 | 11/2013 | Rasmussen et al. |
| 2013/0311881 A1* | 11/2013 | Birnbaum ............ G06F 3/0485 715/702 |
| 2014/0073409 A1 | 3/2014 | Lesley et al. |
| 2014/0218184 A1 | 8/2014 | Grant et al. |
| 2014/0266647 A1 | 9/2014 | Visitacion et al. |

* cited by examiner

| Haptic Output | Example Haptic Output | Meaning of Haptic Output |
|---|---|---|
| Haptic Output #1 | Tap – Tap – Tap – Tap – Tap | Losing Spin |
| Haptic Output #2 | Tap – Tap – Tap – Tap – Tap + TapTap | Win of less than the total bet |
| Haptic Output #3 | Tap – Tap – Tap – Tap – Tap + TapTapTap | Win 1X bet |
| Haptic Output #4 | Tap – Tap – Tap – Tap – Tap + TapTapTap Shortbuzz | Win 5X bet |
| Haptic Output #5 | Tap – Tap – Tap – Tap – Tap + TapTapTap Longbuzz | Win 10X bet |
| Haptic Output #6 | Shortbuzz | Initiation of Spin |

FIG. 4

| Haptic Output | Meaning of Haptic Output | Example Haptic Output |
|---|---|---|
| Haptic Output #1 | New batter | Tap – Tap – Tap |
| Haptic Output #2 | Strike | Long Buzz |
| Haptic Output #3 | Ball | Short Tap |
| Haptic Output #4 | Hit | Double Tap (followed by an Out, Single, Double, Triple or Home Run message) |
| Haptic Output #5 | Foul Ball | Short Buzz |
| Haptic Output #6 | Single | Single Long Buzz With Tap At End |
| Haptic Output #7 | Double | Single Long Buzz With Two Taps At End |
| Haptic Output #8 | Triple | Single Long Buzz With Three Taps At End |
| Haptic Output #9 | Home Run | Repeated Series of Four Taps (e.g., Like a Horse Galloping) |
| Haptic Output #10 | Out | Double Buzz |
| Haptic Output #11 | Double Play | Back to Back Double Buzz |

FIG. 5

WEARABLE WAGERING GAME SYSTEM AND METHODS

CROSS-REFERENCE TO RELATED APPLICATIONS

This application is a continuation of U.S. non-provisional application Ser. No. 14/263,345, filed Apr. 28, 2014, entitled "Wearable Wagering Game System and Methods," which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to wearable gaming apparatus and methods for interacting with such wearable gaming apparatus in the context of a wagering game.

BACKGROUND OF THE INVENTION

Gaming machines, such as slot machines, video poker machines and the like, have been a cornerstone of the gaming industry. Generally, the popularity of such machines with players is dependent on the likelihood (or perceived likelihood) of winning money at the machine and the intrinsic entertainment value of the machine relative to other available gaming options.

Therefore, there is a continuing need for gaming machine manufacturers to continuously develop new games and improved gaming enhancements that will attract frequent play through enhanced entertainment value to the player.

With continued rapid advancements in technology, simultaneously increasing sophistication of players, and increased demands for convenience, gaming machine manufacturers are challenged to continue to enhance the players' gaming experiences by offering new and unexpected options beyond the traditional gaming machines.

SUMMARY OF THE INVENTION

In at least some aspects, the present concepts include a wearable haptic device including one or more input devices, one or more haptic output devices, one or more processors, and a communication device, wherein the one or more processors are configured to cause the one or more haptic output devices to output a haptic output, of a plurality of haptic outputs, responsive to an event in a game, of a plurality of possible game events, in accord with a mapping of haptic outputs to game events.

In another aspect, the present concepts include a wagering game system comprising a gaming system configured to randomly determine an outcome for a wagering game, a wearable device comprising one or more input devices, one or more haptic output devices, one or more processors, one or more memory devices, and a wireless communication device and a gaming system communication device configured to transmit the randomly determined outcome for the wagering game to the wireless communication device of the wearable device. The processor(s) of the wearable device output to the one or more haptic output devices, in accord with a mapping of a plurality of discrete events in a wagering game to a corresponding plurality of discrete haptic outputs, a signal to cause the haptic output device(s) to output a predetermined haptic output corresponding to the randomly determined outcome.

According to one aspect of the present concepts, a wagering game system includes a wearable device having one or more input devices, one or more haptic output devices, and a communication device. A game-logic circuit, borne locally or remotely relative to the wearable device, includes a processing unit and a memory device, which stores instructions that, when executed by the processing unit, causes the game-logic circuit to conduct the wagering game responsive to a received wager, determine a randomly-determined outcome for the wagering game and communicate at least the randomly-determined outcome to the wearer of the wearable device via a plurality of haptic outputs from the haptic output device(s) in accord with a mapping of the plurality of haptic outputs to a corresponding plurality of discrete events or award levels to represent events occurring during the wagering game.

In still other aspects of the present concepts, a computer-implemented method of providing game feedback to a user of a wearable device, used a wagering game system comprising one or more processors and one or more memory devices configured, in combination, to conduct a wagering game and determine a random outcome for such wagering game, and further comprising a communication device to output at least the random outcome to a wearable haptic device communication device. The computer-implemented method comprises the acts of storing a mapping of a plurality of haptic outputs for the wearable haptic device to a plurality of game events in a physical computer-readable storage device, transmitting, from the communication device of the wagering game system to the wearable haptic device communication device, the at least the random outcome and producing haptic outputs from haptic devices of the wearable haptic device responsive to the at least the random outcome, the produced haptic outputs corresponding to the stored mapping of the haptic outputs to game events.

In another aspect of the present concepts, a computer-implemented method of providing game feedback to a user of one or more wearable device(s), used a game server or service comprising one or more processors and one or more memory devices configured, in combination, to monitor a game and output signals relating to specific game events via a communication device. The output signals are coded as the specific game events, for later conversion to haptic signals in accord with a mapping of game events to haptic outputs, or are converted to haptic signals in accord with a mapping of game events to haptic outputs prior to output via the communication device. The output signals from the game server or service are received by the wearable device(s) and either passed to the haptic device(s) of the wearable device(s), if already converted to haptic signals in accord with the mapping of game events to haptic outputs, or are first converted by the wearable device(s) to haptic signals in accord with the mapping of game events to haptic outputs and then passed to the haptic device(s) if the game server or service did not previously perform such conversion. In various aspects, the game comprises a sporting event or a wagering game.

According to another aspect of the present concepts, a wearable haptic device includes one or more input devices, one or more haptic output devices, a communication device; and a logic circuit comprising a processing unit and a memory device, the memory device storing instructions that, when executed by the processing unit, causes the logic circuit to perform acts of receiving, via at least one of the one or more input devices, a wearer instruction to the logic circuit to receive from the communication device streaming data corresponding to a plurality of events in a game and representing the plurality of events in the game using the one or more haptic output devices by outputting to the one or more haptic output devices a distinct haptic output, of a plurality of distinct haptic outputs, for each of a plurality of events in the game, each distinct haptic output being mapped to a specific one of the plurality of events in the game.

According to yet another aspect of the invention, computer readable storage media is encoded with instructions for directing a gaming system to perform the above methods.

According to still another aspect of the invention, for a gaming system having game-logic circuitry including one or more central processing units and one or more memory devices, and further having a wearable gaming device including a communication device configured to communicate with the game-logic circuitry, a computer-implemented method in association therewith includes acts of receiving, via an input device of the wearable gaming device, an input indicative of a wager and transmitting an indication of the wager to the game-logic circuitry using the communication device of the wearable gaming device. The method further includes the acts of determining, using the game-logic circuitry, a randomly determined game outcome, transmitting, to the communication device of the wearable gaming device, the randomly determined game outcome, and outputting, to one or more haptic devices of the wearable gaming device, a haptic output uniquely mapped to the randomly determined game outcome.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 4 shows an example of a mapping of haptic outputs from a wearable device to wagering game events in accord with at least some aspects of the disclosed concepts.

FIG. 5 shows an example of a mapping of haptic outputs from a wearable device to game events in accord with at least some aspects of the disclosed concepts.

Figure 1:
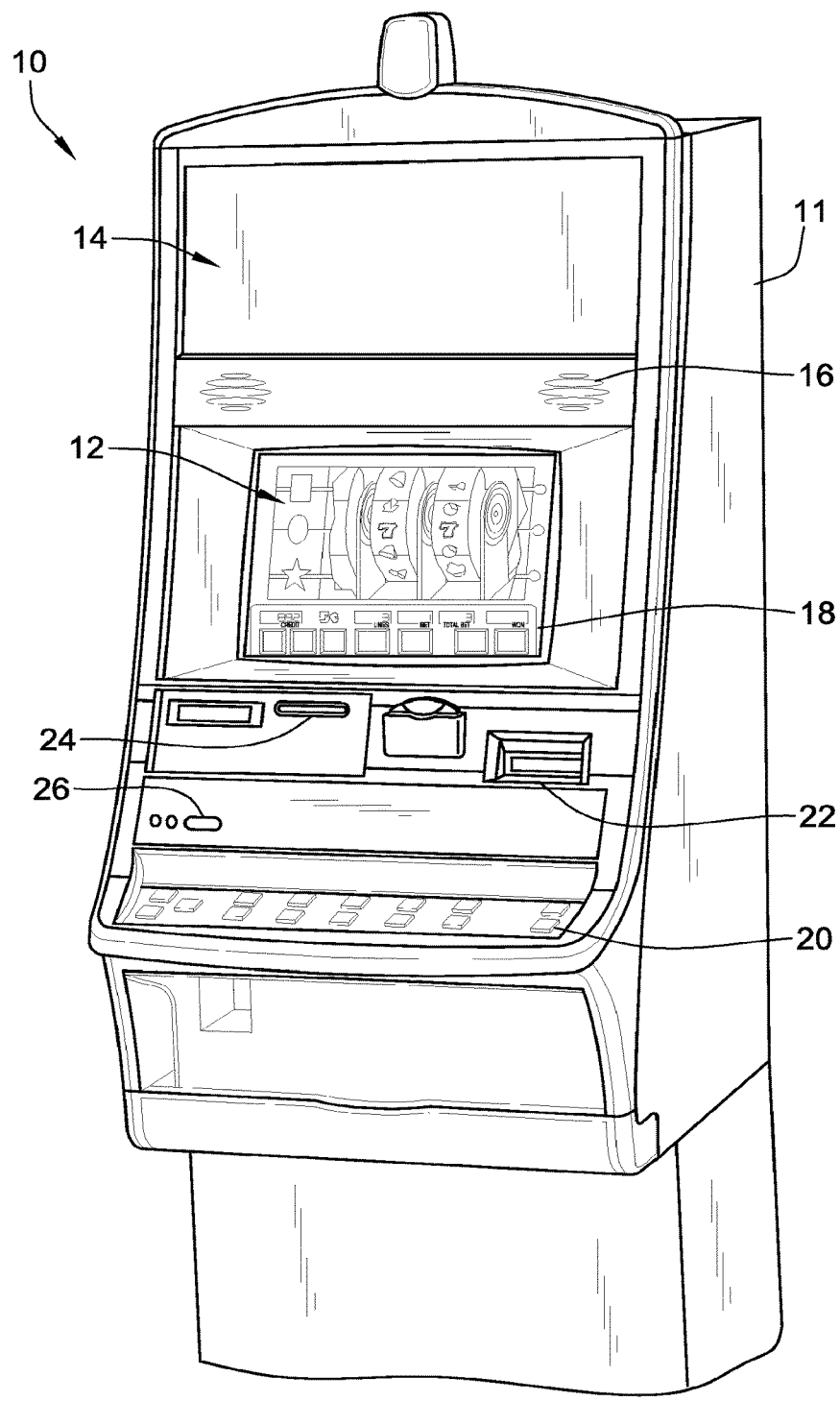
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those used in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in conducting wagering games, or may include non-dedicated devices, such as mobile phones, personal digital assistants, personal computers, etc.

Exemplary types of gaming machines are disclosed in U.S. Pat. No. 6,517,433 and Patent Application Publication Nos. US2014/0073409, US2010/0069160, US2010/0234099, US2009/0005165, and US2008/0132313, which are each incorporated herein by reference in their entirety.

The gaming machine 10 illustrated in FIG. 1 comprises a cabinet 11 that may house various input devices, output devices, and input/output devices. By way of example, the gaming machine 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

Input devices, such as the touch screen 18, buttons 20, a mouse, a joystick, a gesture-sensing device, a voice-recognition device, and a virtual-input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a game-logic circuitry for processing. The electronic data signals are selected from a group consisting essentially of an electrical current, an electrical voltage, an electrical charge, an optical signal, an optical element, a magnetic signal, and a magnetic element.

Figure 2:
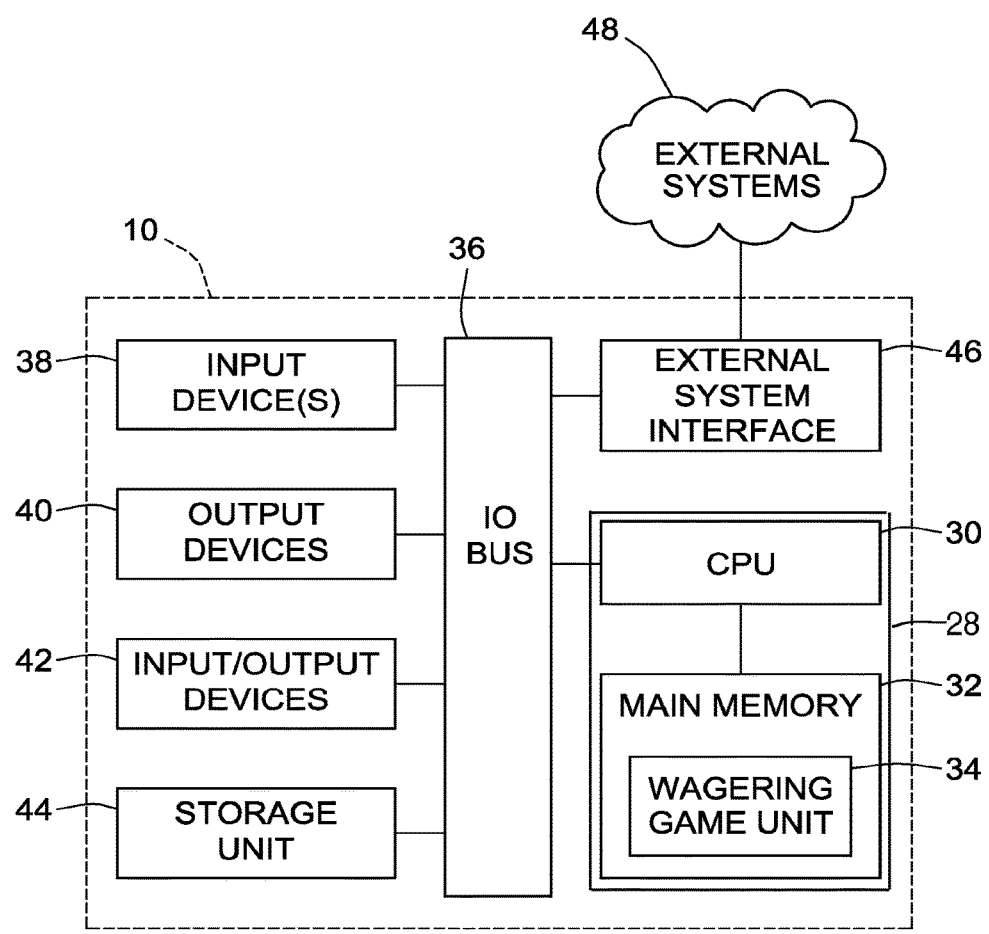
FIG. 2 is a schematic view of a gaming system according to an embodiment of the present invention.

Turning now to FIG. 2, there is shown a block diagram of the gaming-machine architecture. The gaming machine 10 includes game-logic circuitry 28 having a central processing unit (CPU) 30 connected to a main memory 32. The CPU 30 may include any suitable processor(s), such as those made by Intel and AMD. By way of example, the CPU 30 may include a plurality of microprocessors including a master processor, a slave processor, and a secondary or parallel processor. Game-logic circuitry 28, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 28, and more specifically the CPU 30, comprises one or more controllers or processors and such one or more controllers or processors need not be disposed proximal to one another and may be located in different devices or in different locations. The game-logic circuitry 28, and more specifically the main memory 32, comprises one or more memory devices which need not be disposed proximal to one another and may be located in different devices or in different locations. The game-logic circuitry 28 is operable to execute all of the various gaming methods and other processes disclosed herein. The main memory 32 includes a wagering-game unit 34. In one embodiment, the wagering-game unit 34 may cause wagering games to be presented, such as video poker, video black jack, video slots, video lottery, etc., in whole or part.

The game-logic circuitry 28 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to a storage unit 44 and an external-system interface 46, which may be connected to external system(s) 48 (e.g., wagering-game networks).

The external system 48 includes, in various aspects, a gaming network, other gaming machines or terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external-system interface 46 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 48 such that the gaming machine 10 operates as a thin, thick, or intermediate client. The game-logic circuitry 28—whether located within ("thick client"), external to ("thin client"), or distributed both within and external to ("intermediate client") the gaming machine 10—is utilized to provide a wagering game on the gaming machine 10. In general, the main memory 32 (comprising one or more memory devices) stores programming for an RNG, game-outcome logic, and game assets (e.g., art, sound, etc.). When a wagering-game instance is executed, the CPU 30 (comprising one or more processors or controllers) executes the RNG programming to generate one or more pseudo-random numbers. The pseudo-random numbers are utilized by the CPU 30 when executing the game-outcome logic to determine a resultant outcome for that instance of the wagering game. The resultant outcome is then presented to a player of the gaming machine 10 by accessing the associated game assets, required for the resultant outcome, from the main memory 32. The CPU 30 causes the game assets to be presented to the player as outputs from the gaming machine 10 (e.g., audio and video presentations).

The gaming machine 10 may include additional peripheral devices or more than one of each component shown in FIG. 2. Any component of the gaming-machine architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
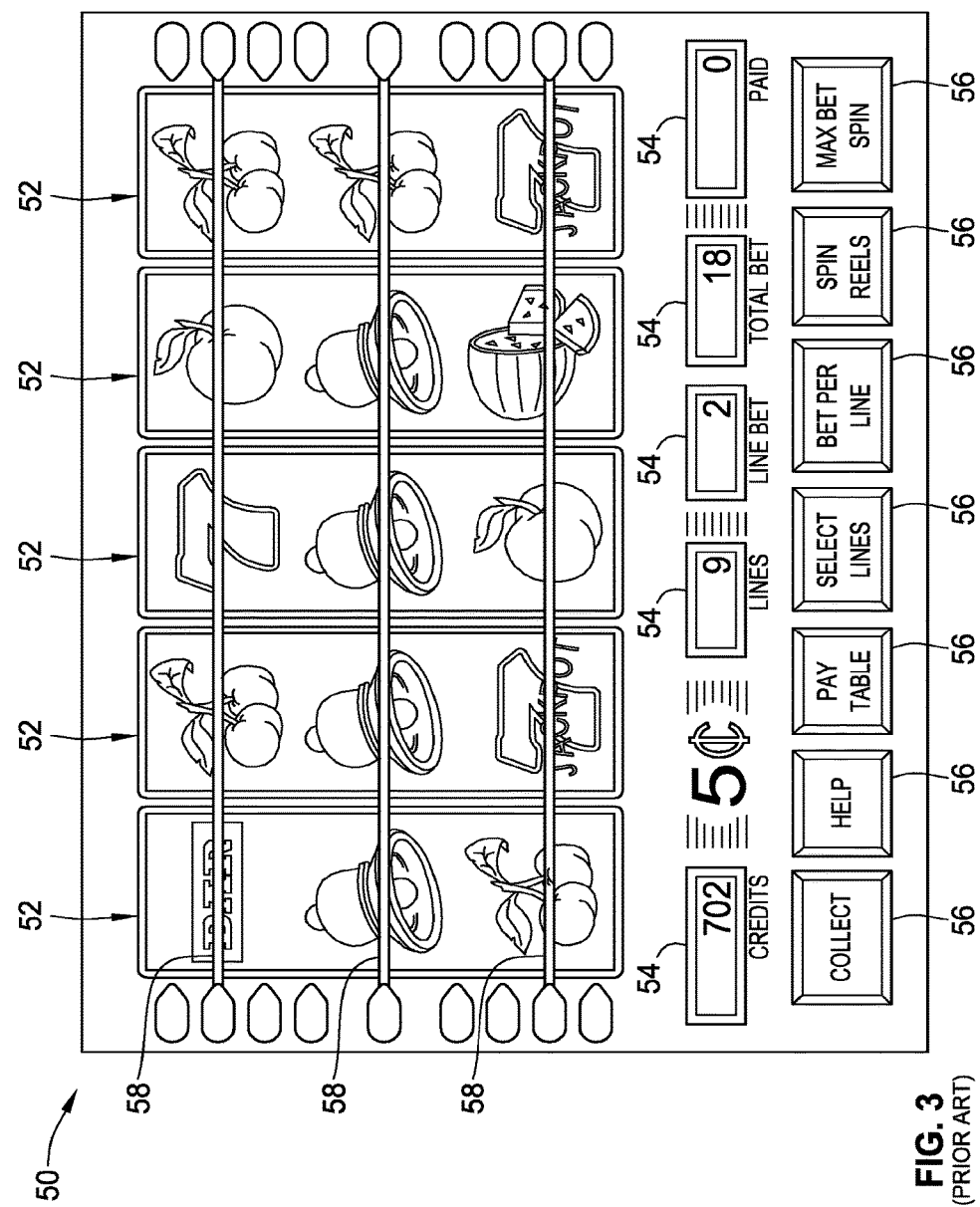
FIG. 3 is an image of an exemplary basic-game screen of a wagering game displayed on a gaming machine, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The game-logic circuitry 28 operates to execute a wagering-game program causing the primary display area 12 or the secondary display area 14 to display the wagering game.

In response to receiving an input indicative of a wager, the reels 52 are rotated and stopped to place symbols on the reels in visual association with paylines such as paylines 58.

The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 12 or secondary display 14) through the display of information such as, but not limited to, text, graphics, static images, moving images, etc., or any combination thereof. In accord with the method of conducting the wagering game, the game-logic circuitry 28 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 28 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 30 causes the recording of a digital representation of the wager in one or more storage media (e.g., storage unit 44), the CPU 30, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU 30 (e.g., the wager in the present example). As another example, the CPU 30 further, in accord with the execution of the stored instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 28 to determine the outcome of the wagering-game instance. In at least some aspects, the game-logic circuitry is configured to determine an outcome of the wagering-game instance at least partially in response to the random parameter.

In accord with the present concepts, the advent of wearable computing devices ("wearables") such as, but not limited to Samsung Gear (Samsung Galaxy Gear, Samsung Gear 2, Samsung Gear Neo, etc.), Sony SmartWatch, and Google Glass, enables a shift in the conventional paradigm of presentation of slot machine games. Wearables offer the user the ability to have applications running and available without much input from the user, much in the same way that a digital wristwatch has long displayed the time and date without user input. Conventional slot machine games, on the other hand, normally require frequent inputs to dedicate a wager and initiate a wagering game. In some aspects, conventional wagering games provide an "autoplay mode" that requires less frequent inputs, but the feedback from the slot machine to the player is provided through visuals and audio, since the operative assumption is that the player is watching and/or listening to the presentation throughout. In the wearable technology world, however, the same operative assumption does not hold true. The purpose of the wearable device itself is to allow the wearer's eyes, ears and/or hands to be free for other things. Google Glass, for example, is configure so that wearers communicate with and through the device (e.g., to the Internet) using natural language voice commands. U.S. Published Patent Application Nos. 2014/0022163, 2013/0235331, 2013/0188080, 2013/0176626 and 2013/0044042 are each incorporated by reference in their entirety herein.

The present concepts advantageously utilize wearables to present to the wearers information relating to slot games, or any repeated wagering event, as a largely, if not entirely, haptic experience. Slots are very focused on a rhythmic experience. The reels stop in a repeated rhythm that is constant and recognizable. Any disruptions of the rhythm draw attention to wins or special events. In accord with the present concepts, a wearable computing device is adapted to provide to a wearer haptic feedbacks representative of wagering game events, the haptic feedback comprising a rhythmic series of taps. For example, any wins in the wagering game would be communicated to the wearer through a series of distinct haptic outputs (e.g., Morse code-like taps and pulses, etc.) that follow the "reel stops," much the same way a bangup follows the reel stops in a visual game.

FIG. 4 shows an example wherein each reel stop is represented by a haptic "tap" output, a short pulse of a predetermined duration and amplitude. FIG. 4 shows that a haptic output mapped to the initiation of a new wagering game (Haptic Output #6) is "Shortbuzz". In at least some aspects, this haptic output would be followed sequentially by a distinct "Tap" representing the stopping of each real, each "tap" being spaced apart by a predetermined interval characteristic of a delay period between conventional wagering game machine reel stops. For a five-reel wagering game, the sequential stopping of the reels would be represented through the haptic device(s) as a sequence of five taps. As shown in FIG. 4, a losing outcome is represented by a haptic output (Haptic Output #1) of "Tap-Tap-Tap-Tap-Tap," wherein there is a predetermined "pause" or "rest interval" comprising a distinct drop in haptic output amplitude between each simulated reel stop. Stated differently, in at least some aspects of the present concepts, a losing outcome is represented by a lack of any additional characterizing haptic outputs indicating a winning outcome. Alternatively, a losing outcome could be mapped to a specific haptic output.

In at least some aspects, the "pause" between the haptic outputs comprises a zero or substantially zero haptic output. Alternatively, the "pause" between the haptic outputs may manifest as a readily perceptible decrease in haptic output sufficient to differentiate each of the reel stops, such as a drop in haptic output of 75% relative to the haptic output of the simulated reel stops.

FIG. 4 shows that, where a winning outcome occurs that yields an award that is less than the total bet (e.g., 10 credits are wagered and a winning outcome yields an award of 5 credits), the haptic output (Haptic Output #2) is "Tap-Tap-Tap-Tap-Tap" followed after by a "TapTap" (two taps in succession without a pause in between the two taps). In distinction, where a winning outcome occurs that yields an award that is equal to the total bet (e.g., 10 credits are wagered and a winning outcome yields an award of 10 credits), the haptic output (Haptic Output #3) is "Tap-Tap-Tap-Tap-Tap" followed after by a "TapTapTap" (three taps in succession without a pause in between the three taps). In this example, where a winning outcome occurs that yields an award that is equal to 5× the total bet (e.g., 10 credits are wagered and a winning outcome yields an award of 50 credits), the haptic output (Haptic Output #4) is "Tap-Tap-Tap-Tap-Tap" followed after by a "TapTapTap" haptic output and a "short buzz" haptic output (e.g., 0.10 seconds, 0.25 seconds, 0.5 seconds, etc.). A winning outcome yielding an award equal to 10× the total bet (e.g., 10 credits are wagered and a winning outcome yields an award of 100 credits), the haptic output (Haptic Output #5) is "Tap-Tap-Tap-Tap-Tap" followed after by a "TapTapTap" haptic output and a "long buzz" haptic output (comparatively longer than the short buzz, such as 0.5 seconds for the long buzz and 0.25 seconds for the short buzz), etc.). The aforementioned levels of awards are merely presented as an illustration and are not to be taken as being limiting. In accord with the present concepts, different awards, or different levels or ranges of awards, are able to be represented uniquely by different haptic outputs to communicate such occurrences to a wearer of the haptic device.

As indicated in the left column of FIG. 4, the present concepts map a distinct haptic output or haptic outputs for each of a plurality of distinctive events in the wagering game. Although an illustrative example of mapping of haptic outputs to a wagering game is provided, this example is not limiting and any set of differentiated haptic outputs may be advantageously mapped to a plurality of gaming events in accord with the present concepts.

The haptic outputs of the wearable are adapted so as to communicate, for a plurality of different win sequences, the size of the wins, or even the types of wins, so the wearer (player) can intuitively understand the flow of the wagering game in the absence of visual outputs. If at any point the wearer wants to see a particular outcome, the wearer can instruct the wearable device (e.g., verbal command, etc.) to bring up visuals of the last spin, of the last past few spins, the last winning spin, the last 5 winning spins, etcetera. Unlike conventional "play while you're away" games, in this invention the wearer (player) is actually experiencing the game in real-time, sans the conventional audio-visual context.

The present concepts are not limited to mechanical reel games and are not even limited to wagering game applications. Instead, the present concepts are advantageously applicable to other wagering paradigms as well including, but not limited to, BetCloud-type wagering events (e.g., a wireless, account-based gaming service enabling players to play wagering games on a personal electronic device in various locations, such as on a cruise ship), sports book events (e.g., races, sporting event outcomes, etc.) or networked gaming systems, so that the player may engage in such wagering activities while simultaneously engaging in other pursuits. The present concepts are further applicable to non-wagering events, such as to merely convey the real-time status of a sporting event.

An example of the present concepts applied in the context of a sporting event is shown in FIG. 5 in relation to the real-time results of a baseball game being communicated to the wearer of the wearable device through a pattern of haptic messages. The player could easily learn the language of a short pattern of pulses to communicate the general play-by-play of a game.

Similar to FIG. 4, the left column of FIG. 5 shows an example wherein a set of ten different haptic outputs from the wearable device are used to denote the play-by-play status of a baseball game. Haptic outputs 1-11 respectively denote the events of a new batter, strike, ball, hit, foul ball, single, double, triple, home run, out, and double play. The haptic outputs 1-11 could be any haptic output, wherein each of the haptic outputs is different in some way. One example is provided in FIG. 5 wherein a new batter is represented by a haptic output from the wearable device of "Tap-Tap-Tap" with a short "pause" or rest between each tap. A strike is represented by a haptic output of a long buzz. The temporal context of "long" is a relative rather than absolute term, as it is relative to durations of other haptic outputs. By way of non-limiting illustrative example, a "long" haptic output is 0.25 seconds and a "short" haptic output is 0.10 seconds. The actual length of time is therefore variable and the only requirement is that of differentiation, the ability of the wearer to readily discern the different outputs from one another.

In yet other wagering game aspects, the present concepts could be extended to other wagering games, such as keno. In keno, the player is paid based on how many of 20 drawn numbers match the numbers selected on the player's ticket and according to the applicable paytable (e.g., based on the casino, wager amount, etc.). As one example, each drawn number is represented by a "Tap" with a match followed by a short Buzz and no match following by an absence of a haptic output. The wearer can count along with each Buzz to determine where he or she stands relative to the potential payout. Since the potential payouts are related to the number of matches, as opposed to the particular numbers drawn and played, the keno variant in accord with the present concepts simplifies the wagering game presentation by removing extraneous information, which well suits the nature of the wearable device.

Continuing with the example of FIG. 5, a "Ball" is a short tap and a "Hit" is a double tap (followed by a Foul, Out, Single, Double, Triple or HR message). Further to the "Hit" haptic output, an additional characterizing haptic output is appended thereto, such as a long buzz with tap at end (a "Single"), a long buzz with two taps at the end (a "Double"), a long buzz with three taps at the end (a "Triple"), a repeated series of four taps, like horse galloping (e.g., a "Home Run"), or a double buzz (an "Out). A "double play" can be denoted as a double buzz.

As with the wagering game example, the wearer of the wearable device may optionally, at any point, access a visual display of one or more recent events or a designated time frame (e.g., to watch the last play of the game), but the communication throughout the game would not be dependent on visual or audio feedback.

Although FIG. 4 and FIG. 5 have presented examples of haptic outputs differentiated to different events. It some aspects, the haptic outputs are predefined (e.g., a wagering game application conducted through the wearable device). In other aspects, the user is permitted to individualize the haptic outputs in whole or in part (e.g., to reassign predetermined haptic outputs, to create new haptic outputs from a template of available base haptic outputs, etc.). Such configuration or re-configuration is performed through one or more of the wearable device input devices (e.g., buttons, touch pad, voice input) or through a wearable device I/O connected to another device (e.g., an external computer).

The examples of FIG. 4 and FIG. 5 were presented in relation to a simplistic example of a single haptic device. In accord with other aspects of the present concepts, the haptic outputs associated with different events for a particular activity (e.g., wagering, sports, etc.) could be provided to a plurality of haptic devices along plural channels, such haptic devices being of the same type or of a different type. As one example, for a wearable device in the form factor of Google Glass, a first haptic device is integrated in the left temple or earpiece and a second haptic device is integrated in the right temple or earpiece. Thus, a haptic output (e.g., a "Tap") could be assigned a first meaning when output to the left temple or earpiece and a second meaning when output to the right temple or earpiece. In another alternative, the same haptic outputs are sent to multiple haptic devices to reinforce the wearer's perception of the output (e.g., providing stereo signals, both left and right channel, to both the left and right temple or earpiece) and/or provide redundancy to output to account for potential movement of the wearable device (e.g., glasses) during movement of the wearer.

Figure 6:
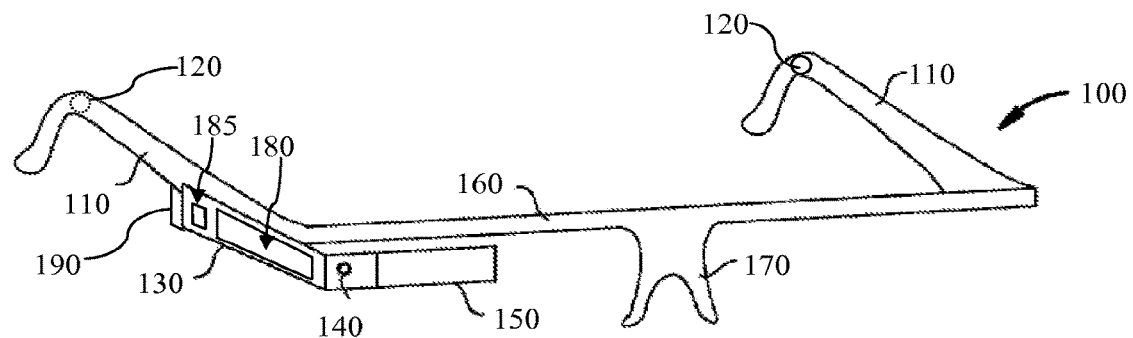
FIG. 6 shows a representation of a wearable device in accord with at least some aspects of the disclosed concepts.

FIG. 6 shows an example of a Google Glass variant configured in accord with at least some aspects of the present concepts. The wearable device 100 is configured to receive, transmit, and display data, in association with an integrated processing device 130. In the form factor illustrated, the wearable device 100 includes temples (side-arms) 110, a center frame support 160, and a bridge portion with nosepiece 170. The center frame support 160 connects the temples 110. A display device 150 and camera 140 are provided in communication with the processing device 130. As shown in the example of FIG. 6, a plurality of haptic devices 120 are provided on the temples 110 in the vicinity of the earpieces and are in communication with the processing device 130 through conductors in the wearable device 100. Input devices shown in FIG. 6 include, but are not limited to, a touch pad 180, a push button 185 and a microphone 190. In other aspects, only a single haptic device 120 is provided (e.g., at the right temple adjacent the processing device 130, at the nosepiece region 170, at the temples (side-arms) 110, etc.). Yet further, the wearable device 100, in some aspects, communicates wirelessly (e.g., Bluetooth, etc.) or through a wired connection to one or more haptic device(s) 120 borne elsewhere on the wearer's body one on more wearable garments or items (e.g., a haptic-integrated glove, hat, shirt, shoe, sock, watch, bracelet, etc.).

With reference to FIG. 6, for example, the wearable device 100 processing device 130 comprises a game-logic circuit including a processing unit (not shown) and a memory device (not shown), the memory device storing instructions that, when executed by the processing unit, causes the game-logic circuit to receive, via the input device(s), an input indicative of one or more wagers and, responsive thereto, to conduct one or more wagering games responsive to the one or more wagers. In the course of conducting these wagering games, the wearable device 100 outputs a plurality of haptic outputs from the one or more haptic output devices in accord with a mapping of the plurality of haptic outputs to one or discrete events or award levels in the wagering game. Non-limiting illustrative examples of such mapping of haptic outputs to discrete events are shown in FIGS. 4-5.

Figure 7A:
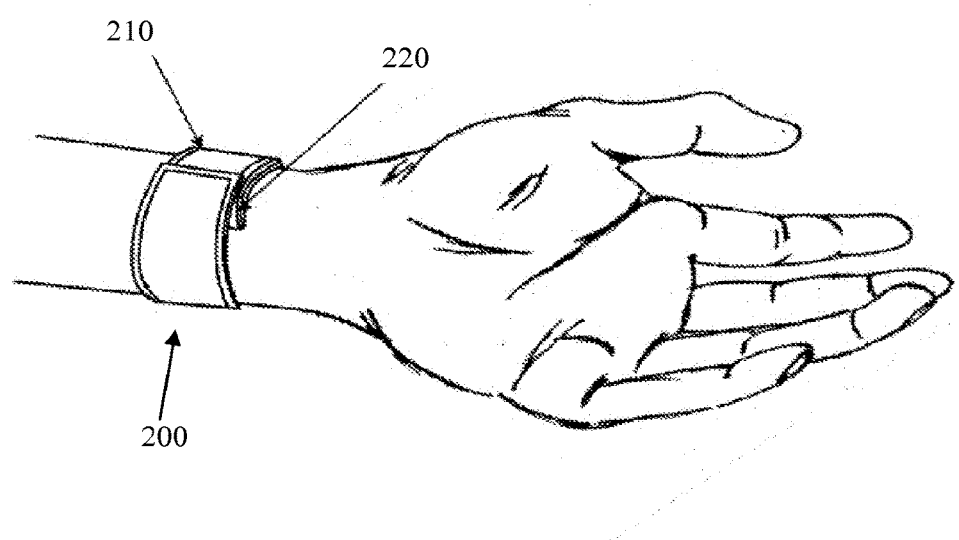
FIGS. 7A-7B show further representations of wearable devices in accord with at least some aspects of the disclosed concepts.
Figure 7B:
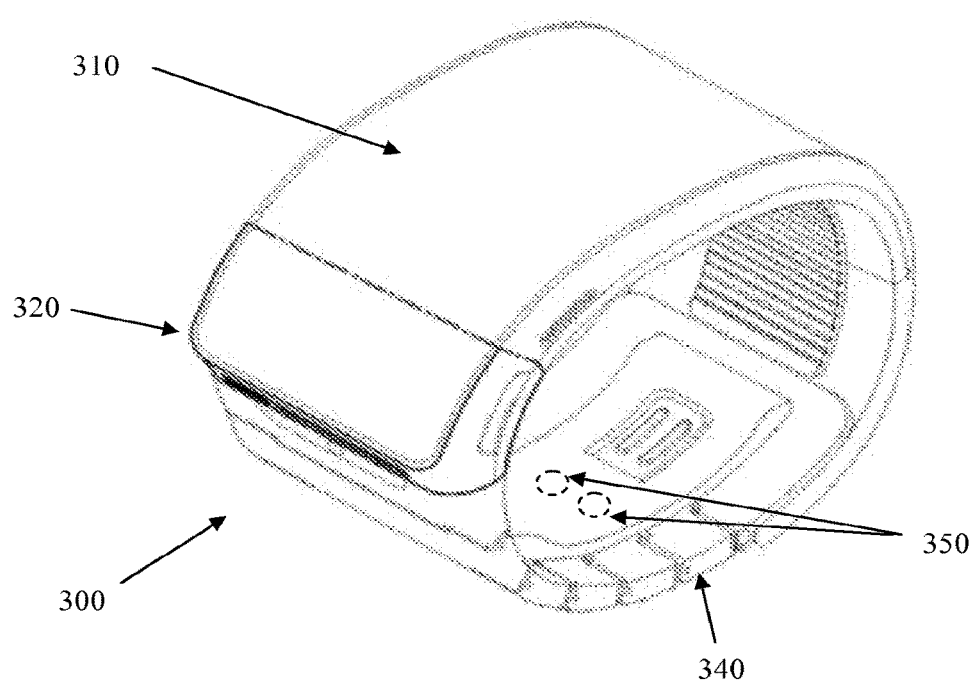

FIGS. 7A-7B show further representations of wearable devices in accord with at least some aspects of the disclosed concepts. FIG. 7A shows a representation of a wristband 200 bearing an optional flexible display 210 or optional conventional LCD display (not shown). As with at least some aspects of the present concepts described above, the wristband 200 incorporates a battery and wireless communication device, represented generally by reference numeral 220. FIG. 7B shows a representation of a wristwatch 300 bearing an optional display 310 and comprising a battery and wireless communication device borne within the wristwatch housing, represented generally by reference numeral 320. The band 340 of the wristwatch 300 shows a plurality of haptic devices 350 disposed within the band, as indicated by the dashed lines. With each of the wristband 200 (FIG. 7A) and the wristwatch 300 (FIG. 7B), one or more haptic devices are disposed within the device, or secured by the device, to convey the haptic outputs directly (i.e., the haptic device is proximate or in contact with the user's skin) or indirectly (i.e., through the medium of the watch and/or the device) to the user. If desired, a user can optionally access, via the display device, graphical output corresponding to the wagering game. As previously mentioned, by way of example, a user could elect to recall one or more previously-played wagering games. Alternatively, the user could opt to watch the wagering game(s) in real-time as they are played. Thus, while the use of haptic outputs in accord with the present concepts provide certain conveniences and form factors that can suit the user's activities, the user is not precluded from simply focusing on enjoyment of both the visual and haptic presentation of the wagering game on the wearable device.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects. By way of illustration, although it is generally advantageous to provide a display device in combination with the wearable device, the display device may be omitted in some aspects of the present concepts, providing yet further form factors for the wearable device (e.g., a headband, a bracelet, a hat, a garment, a shoe, etc.).

By way of further example, in yet additional aspects, the wearable device itself has a plurality of events stored in a memory device of the wearable device (e.g., a solid state memory), such that in a wagering game, only the randomly-determined outcome need be transmitted to the wearable device. In other words, every representation of a wagering game would constitute the same indication of a start of a wagering game and a predetermined sequence of reel stop haptic outputs. These representations of wagering game events need not be individually transmitted to the wearable device for each wagering game. Instead, the randomly-determined outcomes alone are transmitted to the wearable device, from which the surrounding events (e.g., game start, reel stops, etc.) can be faithfully reproduced.

Each of these embodiments and obvious variations thereof is contemplated as falling within the spirit and scope of the claimed invention, at least some aspects of which are set forth in the following claims. Moreover, the present concepts expressly include any and all combinations and subcombinations of the preceding elements and aspects. By way of example, the disclosed mapping of haptic outputs to game events (e.g., wagering game events, sporting game events, etc.) also includes mapping of such haptic outputs to specific haptic devices of the wearable haptic device(s). For example, the wearable haptic device may comprise a plurality of haptic devices worn on different parts of the user's body. The mapping may include not only the type of output (e.g., a "tap-tap-tap" for a bang-up of a 3-reel game), but also the allocation of that output amongst a plurality of haptic devices (e.g., the bang-up being conveyed to a wrist-borne haptic device, but not an eyeglass-borne haptic device, whereas a winning outcome of a first level is conveyed to the eyeglass-borne haptic device, but not the wrist-borne haptic device, and whereas a winning outcome of a second level is conveyed to both the eyeglass-borne haptic device and the wrist-borne haptic device, etc.). In this regard, haptic signals can be allocated by channel to different wearable devices (e.g., wrist-born haptic device, head-borne haptic device, haptic garment, etc.).

What is claimed is:

1. A wagering game system comprising:
   game-logic circuitry configured to randomly select an outcome for a wagering game from a plurality of possible outcomes including a first outcome and a second, different outcome;
   a wearable device having a first and a second haptic output component, one or more processors, one or more memory devices, and a wireless communication device; and
   a system communication device configured to transmit the randomly selected outcome to the wireless communication device;
   the one or more processors of the wearable device being configured to:
      in response to the selected outcome being the first outcome, cause the first haptic output component to output a predetermined haptic message to a wearer of the wearable device; and
      in response to the selected outcome being the second outcome, cause the second haptic output component to output the predetermined haptic message to the wearer.

2. The wagering game system of claim 1, wherein the first outcome is a winning outcome and the second outcome is a losing outcome.

3. The wagering game system of claim 1, wherein the first outcome awards a first award value and the second outcome awards a second, different award value.

4. The wagering game system of claim 1, wherein the first haptic output component is an eyeglass-borne component and the second haptic output component is a wrist-borne component.

5. The wagering game system of claim 1, the one or more processors of the wearable device being further configured to:
   in response to an input command from the wearer, reassign the predetermined haptic message such that:
   in response to a subsequent selected outcome being the first outcome, the one or more processors cause the first haptic output component and the second haptic output component to output the predetermined haptic message to the wearer; and
   in response to the subsequent selected outcome being the second outcome, the one or more processors cause only the first haptic output component to output the predetermined haptic message to the wearer.

6. A wagering game system comprising:
   game-logic circuitry configured to randomly select an outcome for a wagering game from a plurality of possible outcomes including a first outcome and a second, different outcome;
   a wearable device comprising one or more haptic output components, one or more processors, a wireless communication device, and one or more memory devices storing instructions mapping the plurality of possible outcomes to respective corresponding predetermined haptic messages; and
   a system communication device configured to transmit the randomly selected outcome to the wireless communication device;
   the one or more processors of the wearable device being configured to:
      in response to the selected outcome being the first outcome, cause the one or more haptic output components to output a first haptic message to a wearer of the wearable gaming device;
      execute stored instructions to reassign the first haptic message to the second outcome; and
      in response to a subsequent selected outcome in the wagering game being the second outcome, cause the one or more haptic output components to substitute the reassigned first haptic message for output to the wearer.

7. The wagering game system of claim 6, wherein the one or more processors execute the stored instructions to reassign the first haptic message to the second outcome in response to an input command from the wearer.

8. The wagering game system of claim 7, wherein the input command is received at an input device of the wearable device.

9. The wagering game system of claim 6, the one or more processors of the wearable device being further configured to, in response to the subsequent selected outcome being the first outcome, cause the one or more haptic output components to output a second, different haptic message to the wearer.

10. A method of operating a wagering game system, the wagering game system including game-logic circuitry configured to execute a wagering game including a first outcome and a second outcome, a system communication device, and a wearable device having one or more haptic output components, one or more processors, one or more memory devices, and a wireless communication device, the method comprising:

randomly selecting, via the game-logic circuitry, an outcome for the wagering game from a plurality of possible outcomes including a first and a second outcome;

transmitting, from the system communication device to the wireless communication device, the randomly selected outcome;

in response to the selected outcome being the first outcome, the wagering game system causing a first haptic output component of the one or more haptic output components to output a predetermined haptic message to a wearer of the wearable device; and in response to the selected outcome being the second outcome, the wagering game system causing a second haptic output component of the one or more haptic output components to output the predetermined haptic message to the wearer.

11. The method of claim 10, wherein the one or more processors of the wearable device cause the one or more haptic output components to output the haptic messages.

12. The method of claim 10, further comprising, in response to the selected outcome being the second outcome, the wagering game system causing both the first and second haptic output components to output the predetermined haptic message to the wearer.

13. The method of claim 10, wherein the wagering game is a sports book event, and the plurality of outcomes correspond to different incidents occurring in a sporting event.

14. The method of claim 13, wherein the sporting event is a real-time sporting event.

15. The method of claim 13, further comprising the game-logic circuitry transmitting, from the system communication device to the wireless communication device, a play-by-play status of the sporting event, and, in response to the play-by-play status including a first incident of the sporting event, the one or more processors causing the first haptic output component to output a predetermined haptic message to the wearer, and, in response to the play-by-play status including a second incident of the sporting event, the one or more processors causing the first haptic output component to output a different predetermined haptic message to the wearer.

16. The method of claim 14, wherein the first outcome represents a first award corresponding to a win by a first participant in the sporting event, and wherein the second outcome represents a second award corresponding to a win by a second participant in the sporting event.

17. A method of operating a wagering game system, the wagering game system including game-logic circuitry configured to execute a wagering game including a first outcome and a second outcome, a system communication device, and a wearable device having one or more haptic output components, one or more processors, one or more memory devices, and a wireless communication device, the method comprising:

randomly selecting, via the game-logic circuitry, an outcome for the wagering game from a plurality of possible outcomes including a first and a second outcome;

transmitting, from the system communication device to the wireless communication device, the randomly selected outcome;

in response to the selected outcome being the first outcome, the wagering game system causing at least one of the one or more haptic output components to output a first haptic message to a wearer of the wearable gaming device;

executing, via the wagering game system, stored instructions to reassign the first haptic message to the second outcome; and in response to a subsequent selected outcome in the wagering game being the second outcome, the wagering game system causing at least one of the one or more haptic components to substitute the reassigned first haptic message for output to the wearer.

18. The method of claim 17, farther comprising, in response to the subsequent selected outcome being the first outcome, the wagering game system causing at least one of the one or more haptic output components to output a second, different haptic message to the wearer.

19. The method of claim 18, wherein the second, different haptic message is created from a template of available haptic outputs.

20. The method of claim 17, further comprising, in response to the selected outcome being the second outcome, the wagering game system causing the first and the second haptic output components to output the predetermined haptic message to the wearer.

\* \* \* \* \*